US006516496B2

(12) United States Patent
Ekron

(10) Patent No.: US 6,516,496 B2
(45) Date of Patent: Feb. 11, 2003

(54) DEVICE FOR FACILITATING MANUAL GRIPPING OF PIPES AND CONNECTORS

(75) Inventor: Amir Ekron, Ramat Hasharon (IL)

(73) Assignee: Easy-Con Ltd., Ramat Hasharon (IL)

( * ) Notice: Subject to any disclaimer, the term of this patent is extended or adjusted under 35 U.S.C. 154(b) by 0 days.

(21) Appl. No.: 09/816,566

(22) Filed: Mar. 26, 2001

(65) Prior Publication Data

US 2002/0133910 A1 Sep. 26, 2002

(51) Int. Cl.[7] .............................. E05B 1/00; E05B 7/00; B25B 13/00; F16L 55/00; F16K 43/00

(52) U.S. Cl. .............................. 16/422; 16/436; 16/443; 16/114.1; 81/186; 285/39; 137/317; 137/318

(58) Field of Search .......................... 16/422, 421, 431, 16/436, 443, 114.1; 81/57.15, 57.33, 186; 294/136, 16; 285/39; 137/317, 318

(56) References Cited

U.S. PATENT DOCUMENTS 1,730,820 A * 10/1929 Holden ........................ 16/431
2,819,111 A * 1/1958 Cozzens ..................... 294/106
3,547,355 A * 12/1970 Salazar ....................... 137/843
3,730,209 A * 5/1973 Binard et al. ............... 137/217
4,470,177 A * 9/1984 Ganung et al.
4,647,073 A * 3/1987 Kosaka ....................... 137/318
5,694,972 A * 12/1997 King
6,183,400 B1 * 2/2001 Pope ........................... 16/422
6,247,204 B1 * 6/2001 Hamby et al. ................ 16/431
6,317,950 B1 * 11/2001 Irwin .......................... 29/237
6,360,402 B1 * 3/2002 Crabtree ...................... 16/422

* cited by examiner

*Primary Examiner*—Anthony Knight
*Assistant Examiner*—Vishal Patel
(74) *Attorney, Agent, or Firm*—Mark M. Friedman

(57) ABSTRACT

A device for facilitating manual gripping of pipes and connectors includes first and second elements hingedly interconnected and biased open by a spring element. Each element includes a channel with projections deployed to define gripping features for gripping a roughly cylindrical object of given outer diameter. The first and second elements provide grasp surfaces which, in the closed position, lie within a cylindrical volume of diameter four times the given outer diameter and generally circumscribe the object.

20 Claims, 7 Drawing Sheets

Gripper

16mm pipe

180° connector

16mm pipe - one side connector

180° connector

90° connector

T-Type connector

DEVICE FOR FACILITATING MANUAL GRIPPING OF PIPES AND CONNECTORS

FIELD AND BACKGROUND OF THE INVENTION

The present invention relates to tubing systems in which flexible pipes are interconnected by forced insertion of connectors and, in particular, it concerns a device for facilitating manual gripping of pipes and connectors.

It is known to employ systems of flexible plastic pipes with various connectors for drip irrigation. Drip irrigation is of particular importance in hot climates with low rainfall, where water is a valuable commodity. Drip irrigation is widely used in commercial agriculture in many areas of the USA, South America, southern Europe, the Middle East, South Africa, China, India and Australia. The use of drip irrigation systems for public gardens, domestic applications and in hot-houses is also rapidly growing.

For pipes of large diameter or which are used for high pressure, large multi-piece connectors are used. These connectors are relatively expensive and require a series of operations to deploy them. In most cases, attachment of pipes of diameter up to about 25 mm is achieved more cheaply and simply by forcing the end of a pipe onto a simple, one-piece, molded-plastic connector which has a number of barbed ridges which prevent the pipe from slipping off. This attachment operation is typically performed manually by gripping the pipe in one hand, the connector in the other, and pushing them together. The tightness of the fit and the difficulty in gripping the smooth pipe and the small connectors render this operation strenuous and uncomfortable to perform. The operation is repeated very many times during assembly of a typical irrigation system, resulting in excess strain on the workers and frequently leading to formation of blisters or other minor injuries.

In the field of devices and accessories for connection to irrigation systems, there exist many clamping structures configured for permanent clamped connection to an irrigation pipe. None of these, however, is capable of instantly gripping a pipe or connector to facilitate the attachment procedure and then immediately releasing the pipe or connector.

In other fields of technology, it is known to use pipe-gripping pliers, typically with a scissors-type action which have jaws formed for gripping a pipe lying transverse to the length of the scissors arms. The position of the handles of such pliers is far from the pipe itself. As a result, such devices are suited for supporting a pipe during processing such as for welding a section of metal pipe, but are not suitable for applying significant forces along the length of a pipe such as is required during the aforementioned attachment operation for flexible pipes.

There is therefore a need for a device for facilitating manual gripping of pipes and connectors which would be instantly deployable and removable, and which would make easier the operation of attaching pipes and connectors for irrigation systems, and which would increase both the speed and quality of work performed.

SUMMARY OF THE INVENTION

The present invention is a device for facilitating manual gripping of pipes and connectors.

According to the teachings of the present invention there is provided, a device for facilitating manual gripping of pipes and connectors comprising: (a) a first element; (b) a second element hingedly attached to the first element at a hinge structure, the hinge structure being configured such that the first element is rotatable relative to the second element about a hinge axis from a closed position through a range of angles no more than 180° to a fully open position; and (c) a spring element deployed to bias the first element relative to the second element towards the open position, wherein each of the first element and the second element includes a channel extending substantially parallel to the axis, a plurality of projections being deployed projecting into each channel so as to define gripping features, the channels and the gripping features being formed such that, when the first element and the second element assume the closed position, the gripping features are located so as to grip a substantially cylindrical object of outer diameter D located parallel to the axis between the first element and the second element, and wherein the first element and the second element are configured to provide, respectively, first and second grasp surfaces which, at least in the closed position, lie within a cylindrical volume of diameter 4D circumscribing the channels, the first and second grasp surfaces being shaped such that they can be pressed together by a single hand of a user to close the device around a substantially cylindrical object such that the gripping features grip the object and the grasp surfaces substantially circumscribe the object.

According to a further feature of the present invention, the second element is substantially a mirror image of the first element.

According to a further feature of the present invention, the projections are implemented as projecting ridges extending around at least part of the channels in a direction substantially perpendicular to the axis, the projecting ridges being spaced apart along the axis.

According to a further feature of the present invention, the channels extend across an entire dimension of the first and the second elements from a first edge to a second edge along a length L, a portion of the channels which lies within at least about 10 percent of length L from the first edge being formed such that, when the first element and the second element assume the closed position, the channels accommodate a cylindrical element of diameter at least 15 percent greater than D.

According to a further feature of the present invention, the first and the second elements each further include a lateral recess configured such that, when the first element and the second element assume the closed position, the lateral recesses form a lateral opening of diameter at least 15 percent greater than D interconnecting with the channels.

According to a further feature of the present invention, the first and the second elements each further include a lateral recess configured such that, when the first element and the second element assume the closed position, the lateral recesses form a lateral opening of diameter approximately equal to D interconnecting with the channels.

According to a further feature of the present invention, there is also provided a detachable hole puncher element formed with at least one blade configured for forming a hole through a plastic wall of a pipe, the hole puncher element and the first and second elements being formed with complementary engagement features configured such that the hole puncher element releasably engages the first and second elements so as to retain the first and second elements in the closed position to provide a handle to facilitate operation of the hole puncher element.

According to a further feature of the present invention, the hole puncher element is configured to engage the first and second elements from either of two directions.

According to a further feature of the present invention, the first and the second elements are each formed primarily from a molded plastic material.

According to a further feature of the present invention, each of the first and the second elements is formed with a plurality of drainage holes connecting between the channel and an external surface of the element.

According to a further feature of the present invention, the hinge structure is configured such that the first element is rotatable relative to the second element about the hinge axis from the closed position through a range of angles no more than 90° to the fully open position.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
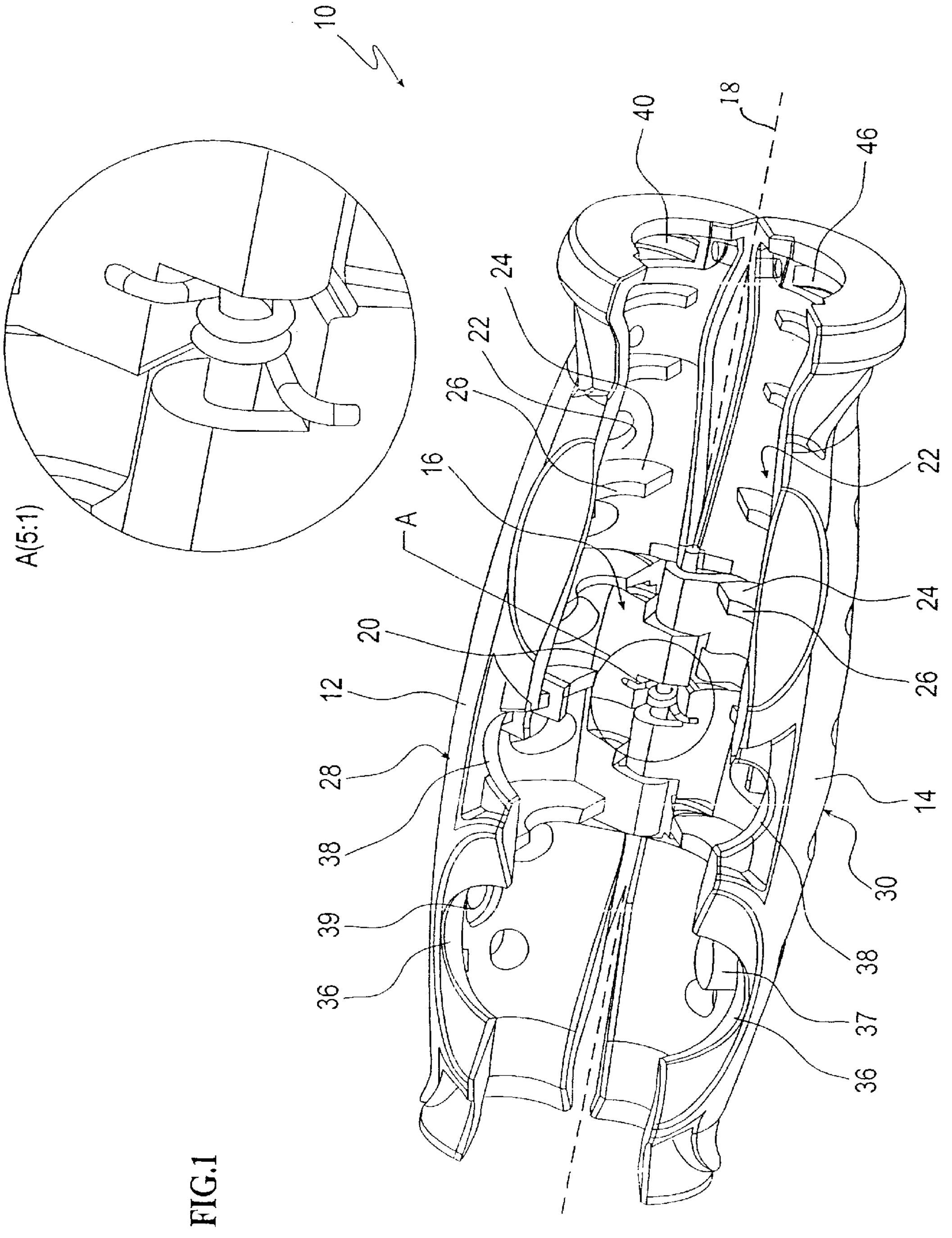
FIG. 1 is an isometric view of a preferred implementation of a device, constructed and operative according to the teachings of the present invention, for facilitating manual gripping of pipes and connectors, the device having a pair of elements shown here in an open position.
Figure 2:
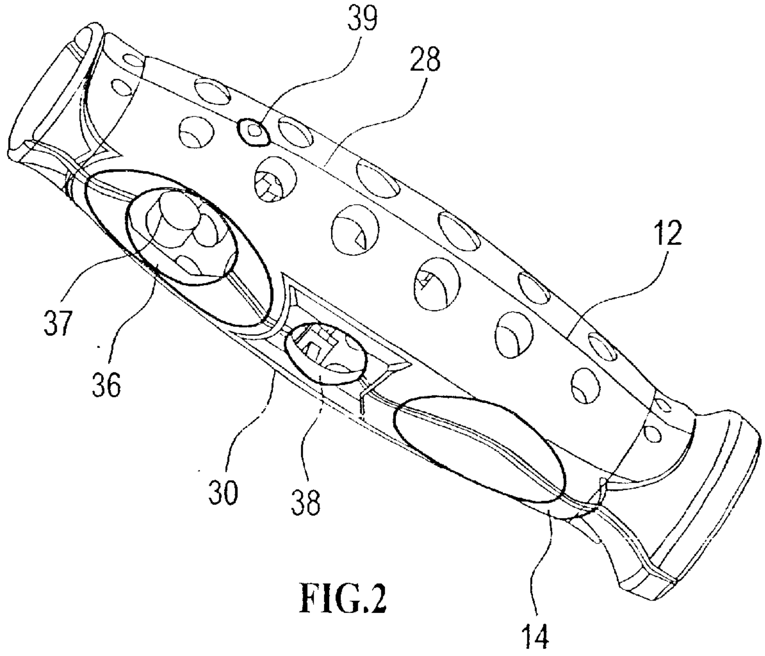
FIG. 2 is an isometric view of the device of FIG. 1 with the pair of elements in a closed position.
Figure 3:
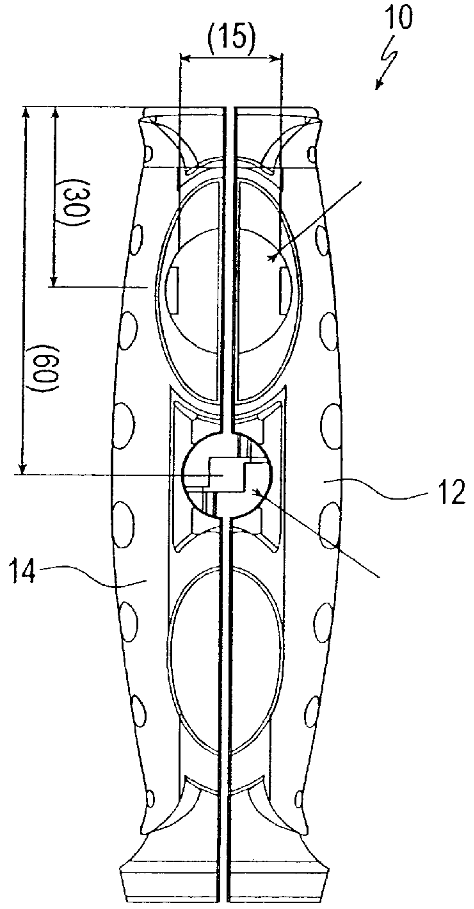
FIG. 3 is a plan view of the device of FIG. 1 in a closed position.

The present invention is a device for facilitating manual gripping of pipes and connectors, primarily for the purpose of attaching them.

The principles and operation of devices according to the present invention may be better understood with reference to the drawings and the accompanying description.

Referring now to the drawings, FIGS. 1–5 illustrate the structural features of a preferred implementation of a device, generally designated 10, constructed and operative according to the teachings of the present invention, for facilitating manual gripping of pipes and connectors. The particular significance of a number of these preferred features will then be illustrated in the context of a number of applications with reference to FIGS. 6–11. Then, with reference to FIGS. 12–16, the structure and operation of various hole punch elements, configured for use together with one or more device 10, will be described. Finally, a simplified implementation of the device of FIG. 1 will be described with reference to FIG. 17.

Turning first to FIGS. 1–5, generally speaking, device 10 includes a pair of elements 12 and 14 which are hingedly attached to each other at a hinge structure 16. Hinge structure 16 is configured to allow relative rotation of elements 12 and 14 about an axis 18 from a closed position (FIG. 2) through a range of angles of no more than 180°, and preferably no more than 90°, to a fully open position (FIG. 1). A spring element 20 is deployed to bias elements 12 and 14 towards the open position.

Figure 4:
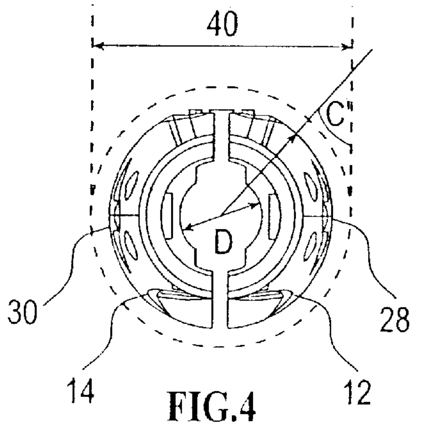
FIG. 4 is an end view of the device of FIG. 1 in a closed position.

Each element 12 and 14 includes a channel 22 extending substantially parallel to axis 18. A number of projections 24 project into each channel 22 so as to define gripping features 26. Channels 22 and gripping features 26 are formed such that, when elements 12 and 14 are in the closed position, gripping features 26 are located so as to grip a substantially cylindrical object of outer diameter D located parallel to the axis between the first element and the second element. Elements 12 and 14 are also configured to provide, respectively, first and second grasp surfaces 28 and 30 which, at least in the closed position, lie within a cylindrical volume of diameter 4D circumscribing channels 22 (FIG. 4). First and second grasp surfaces 28 and 30 are shaped such that they can be pressed together by a single hand of a user to close the device around a substantially cylindrical object such that gripping features 26 grip the object and grasp surfaces 28 and 30 substantially circumscribe the object.

At this stage, it will be readily understood that the device of the present invention provides an instantly deployable and removable tool to enhance manual gripping of a pipe or connector in a manner facilitating application of axial forces such as required for attachment of pipes and connectors. Specifically, the device is held between the thumb and fingers of one hand in its biased-open state of FIG. 1, positioned around a pipe or connector and closed by pressure applied between the thumb and fingers. Once closed, the device firmly grips the surface of the pipe or connector while providing contoured grasp surfaces for the user's hand which facilitate comfortable and effective application of axial forces. The location of the grasp surfaces, substantially circumscribing the pipe or connector, avoid generation of a twisting moment from the axial force applied. On relaxation of the user's hand, the device opens itself under the action of spring element 20, thereby releasing the pipe or connector. Thus, the operations of gripping and releasing the pipe or connector are performed in an intuitive manual fashion without any impediment, while the discomfort normally associated with application of the forces required for attachment is greatly reduced or eliminated. These and other advantages of the present invention will be better understood from the additional detailed description which follows.

Gripping features 26 are described as being "located so as to grip a substantially cylindrical object of outer diameter D" when elements 12 and 14 assume their closed position. It should be noted in this context that device 10 is useful for gripping pipes, connectors and other elements with a significant range of diameters from D up to 10 or 15% larger than D. For each diameter, clamping occurs at a corresponding stage of closure of the device. The dimension D defined by the device in its fully closed state is the minimum value of object diameter for which effective clamping can be achieved.

Turning now to the features of a preferred implementation of the present invention in more detail, elements 12 and 14 are shown here implemented substantially as a mirror image of each other. This renders the device symmetrical in use such that it can be held in either hand and inverted. Thus, in a preferred implementation in which a user is to be provided with a pair of devices 10, one for each hand, the user need not differentiate between a "left-handed" device and a "right-handed" device. The elements are described as "substantially a mirror image" so long as the variations between them do not render them clearly asymmetric with respect to right- or left-handedness. In the preferred implementation illustrated here, the only significant features which are not a mirror image are the interlocking projections forming part of hinge structure 16. Here, the projections are clearly complementary rather than symmetrical.

Parenthetically, it should be noted that an alternative asymmetric implementation (not shown) provides alternative advantages for certain applications. Specifically, in an implementation in which grasp surfaces 28 and 30 are shaped to be specific to a right-handed grip or a left-hand grip, these surfaces may be formed to provide near-optimal ergonomic grip contours to further spread forces applied to the hand during use.

Figure 5:
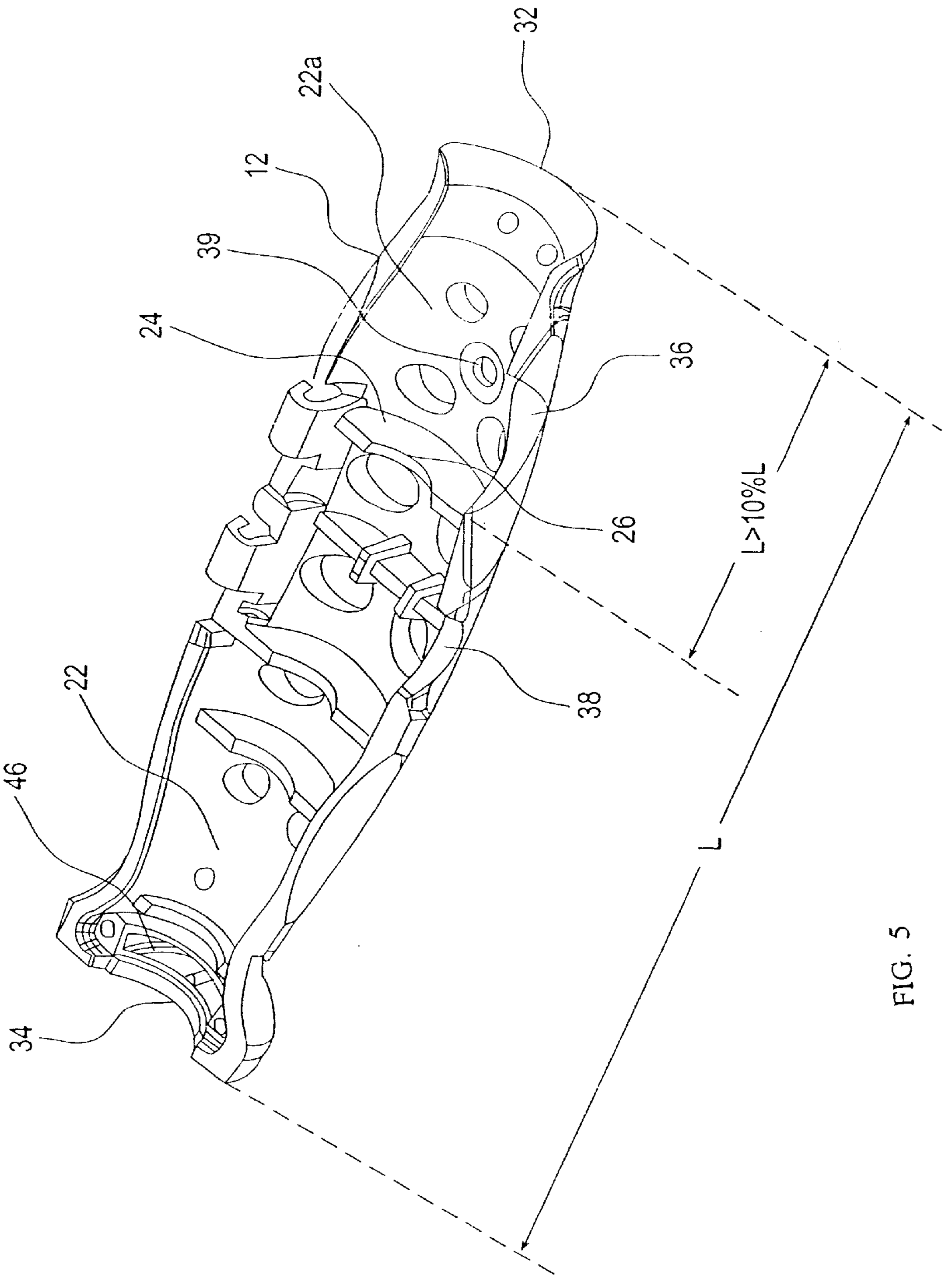
FIG. 5 is an isometric view of one of the elements from the device of FIG. 1.

As best seen in FIGS. 1 and 5, projections 24 are here implemented as projecting ridges 24 extending around at least part of channels 22 in a direction substantially perpendicular to axis 18. This configuration is particularly effective for securing a pipe or connector against axial slippage. Projecting ridges 24 are preferably spaced apart along axis 18, thereby gripping a pipe at multiple locations to avoid localized stress.

Preferably, channels 22 extend across an entire dimension of each element 12 and 14 from a first edge 32 to an opposite edge 34 along a length L. A portion 22*a* of channels 22 which extends along a length l corresponding to at least about 10 percent of length L from first edge 32 is preferably formed such that, in the closed state, channels 22 accommodate a cylindrical element of diameter at least 25 percent greater than D. This is typically achieved by omitting projections 24 from this end portion 22*a*. The oversized end portion 22*a* provides clearance around a connector to allow insertion of an end of a pipe which is forced onto the connector to form a joint.

It is a particularly preferred feature of most implementations of device 10 that is can accommodate an L-shape or T-shape connector, most preferably configured to facilitate attachment of a pipe to two ports of such a connector without requiring a change of grip on the device holding the connector. To this end, first and second elements 12 and 14 preferably each further include a lateral recess 36 configured such that, in the closed position, lateral recesses 36 together form a lateral opening interconnecting with channels 22. Here too, to facilitate attachment of a pipe to the transversely-projecting connector port, the lateral opening preferably has a diameter at least 15 percent greater than D. To facilitate connection to two ports of the connector without shifting the grip on the device, lateral recesses 36 are preferably located within, or adjacent to, the region of oversized end portion 22*a*.

In order to increase the tolerance of device 10 to accommodate a wide range of sizes of connectors, at least one rubber pad 37 is preferably deployed in channel 22 of each element 12 and 14 adjacent to lateral recess 36. These pads are effective to grip small connectors with external diameters even smaller than the nominal minimum operative diameter D of device 10, while at the same time being sufficiently flexible to accommodate large connectors. Pads 37 are conveniently implemented with a barbed pin which engages within corresponding openings 39 in each element 12 and 14.

In a similar vein, it should be noted that some or all of gripping features 26 may optionally be implemented using rubber or similar material to enhance the tolerance of the device to grip different sized pipes and to increase friction. In many cases, however, the simpler molded plastic structure shown herein with the addition of only pads 37 provides excellent results in a highly cost effective manner.

According to a further preferred feature, first and second elements 12 and 14 each further include a second lateral recess 38 configured such that, when device 10 is closed, second lateral recesses 38 together form a second lateral opening of diameter approximately equal to D interconnecting with channels 22. This second lateral opening is particularly suited for gripping a straight connector in a laterally projecting position which renders it comfortable to force into engagement with a pipe end, as will be described with reference to FIG. 8 below.

It will be noted that the device of the present invention is not limited to any particular choice of materials. Nevertheless, it is thought particularly advantageous that first and second elements 12 and 14 are each formed primarily, and typically exclusively, from a molded plastic material. This offers the required durability and corrosion resistance while being lightweight and comfortable to handle. Preferably, each of elements 12 and 14 is formed with a plurality of drainage holes connecting between channel 22 and an external surface of the element, thereby facilitating rinsing out of any mud or dirt which may collect within the device. These drainage holes also help to further enhance the grip of a user's hand on grasp surfaces 28 and 30.

Figure 6:
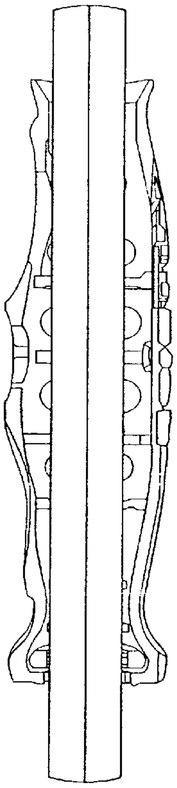
FIG. 6 is a cross-sectional view illustrating the use of the device of FIG. 1 for gripping a pipe.

Turning now briefly to FIGS. 6–11, these illustrate schematically a number of principal modes of use of device 10. Firstly, FIG. 6 shows device 10 used to grip a portion of pipe. In certain applications, one device 10 is used in this manner to grip a pipe while a second is used as described below to grip a connector for the purposes of attaching them to form a connection. It will be noted that the device can readily accommodate and grip pipes with a range of diameters slightly greater than the nominal diameter D, typically by up to about 10 or 15 percent. The larger diameter is accommodated by incomplete closing of the two elements against each other. In fact, in order to ensure reliable and highly effective gripping of the tube, the device is preferably designed so as to clamp a pipe of the intended nominal diameter D just before the two elements fully close against each other.

Figure 7:
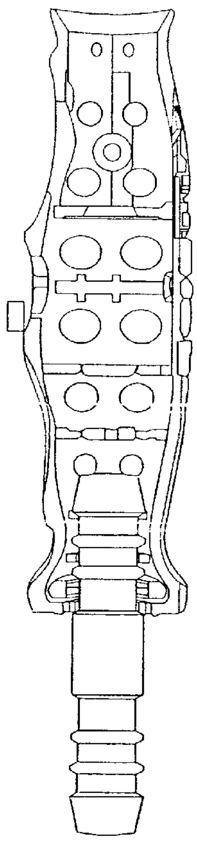
FIG. 7 is a cross-sectional view illustrating the use of the device of FIG. 1 for gripping a straight (180°) connector in a first position.

FIG. 7 illustrates a first manner of gripping a straight connector between ends 34 of elements 12 and 14.

Figure 8:
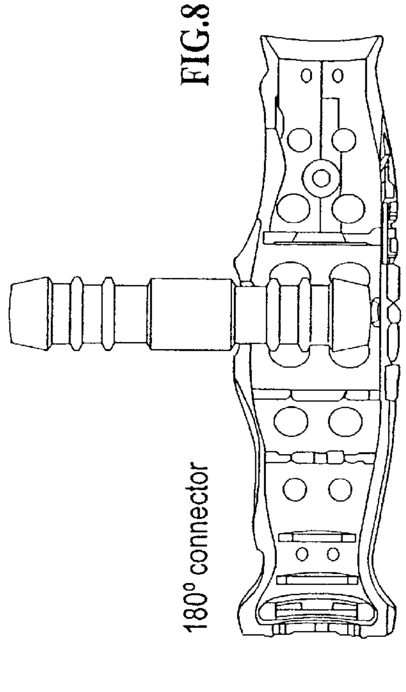
FIG. 8 is a cross-sectional view illustrating the use of the device of FIG. 1 for gripping a straight (180°) connector in a second position.

FIG. 8 illustrates the use of the second lateral opening, formed by lateral recesses 38, to grip a straight connector.

Figure 10:
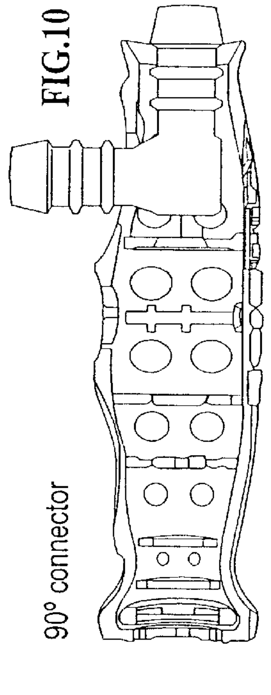
FIG. 10 is a cross-sectional view illustrating the use of the device of FIG. 1 for gripping an L-type (90°) connector.
Figure 9:
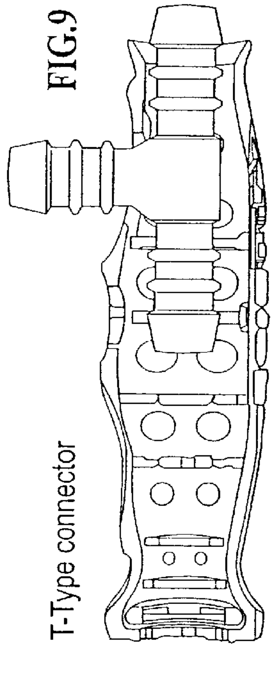
FIG. 9 is a cross-sectional view illustrating the use of the device of FIG. 1 for gripping a T-type connector.

FIGS. 9 and 10 show, respectively, the use of device 10 to grip a T-shaped and an L-shaped connector with the lateral connection port projecting through the lateral opening formed by recesses 36. In this position, pipe ends can readily be attached to two ports of the connector without the user releasing his grip on the connector.

Figure 11:
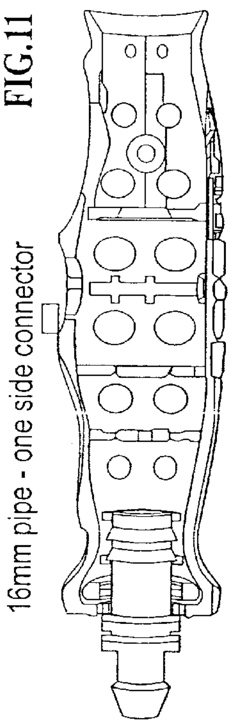
FIG. 11 is a cross-sectional view illustrating the use of the device of FIG. 1 for gripping a one-sided branch connector.

FIG. 11 shows the use of device 10 for gripping a one-sided connector used for inserting through a small hole formed in a larger diameter pipe to add a new branch pipe.

Figure 12:
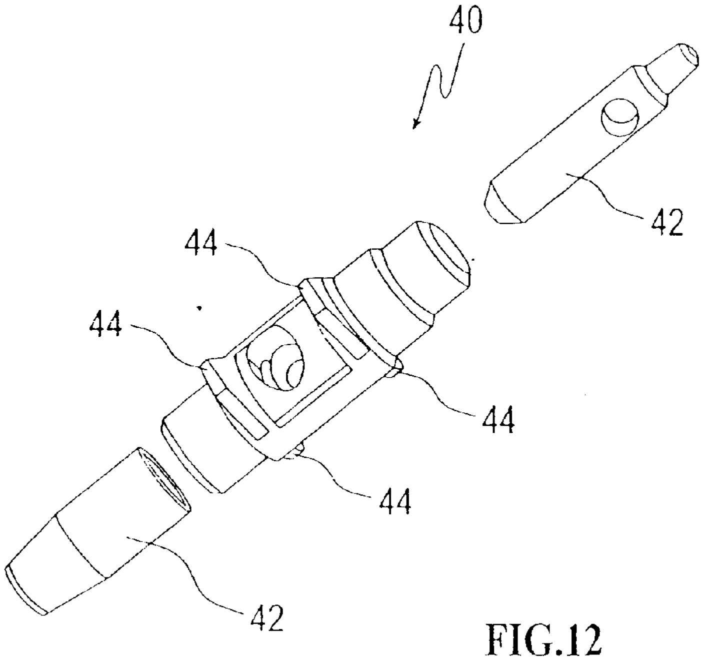
FIG. 12 is an exploded isometric view of a preferred implementation of a hole punch element, constructed and operative according to the teachings of the present invention, for use together with the device of FIG. 1.

Turning now to FIGS. 12–15, it is a further preferred feature of the present invention that device 10 may be used together with at least one additional element to form a hole-punching tool, such as is frequently needed in installation of irrigation systems for installing additional drip emitters or secondary pipes. Thus, FIG. 12 shows a first preferred implementation of a hole puncher element 40. Hole puncher element 40 is formed with at least one, and preferably two, round blades 42 configured for forming a hole through a plastic wall of a pipe, as is known in the art.

In order to facilitate use of hole puncher element 40, hole puncher element 40 and elements 12 and 14 are preferably formed with complementary engagement features configured such that hole puncher element 40 releasably engages elements 12 and 14 so as to retain them in the closed position. In this engaged position, elements 12 and 14 provide a handle (FIG. 14) to facilitate operation of the hole puncher element.

Figure 13:
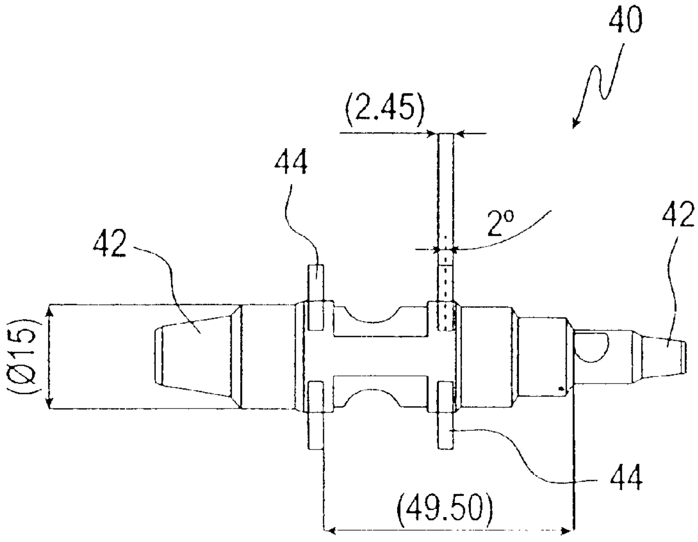
FIG. 13 is a side view of the hole punch element of FIG. 12 after assembly.

In the specific non-limiting example shown in FIGS. 12 and 13, hole puncher element 40 is formed with pairs of transversely projecting tabs 44 which frictionally engage corresponding slots 46 (FIGS. 1 and 5) in elements 12 and 14. Clearly, many other forms of complementary engaging features could be used.

Figure 15:
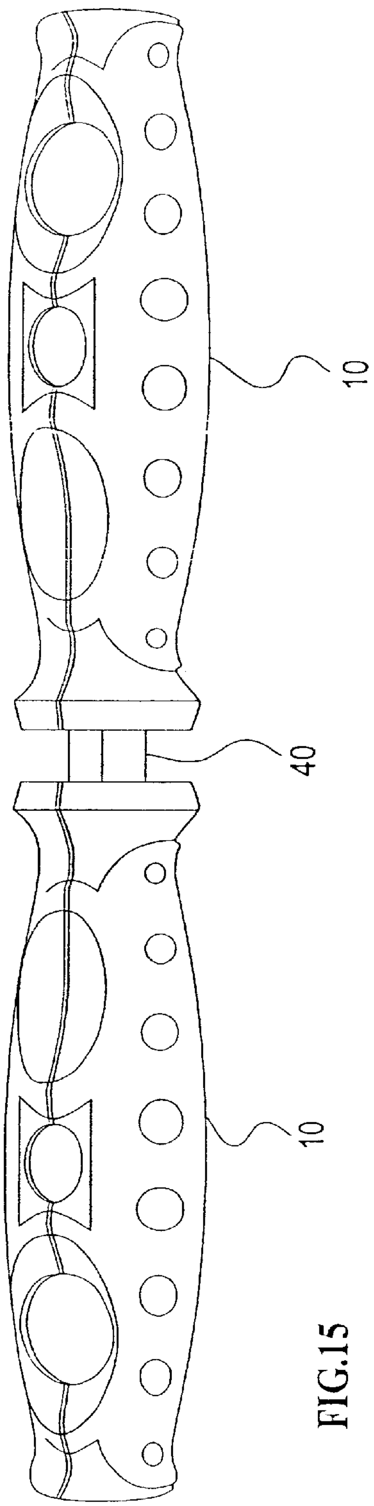
FIG. 15 is an isometric view of a pair of devices similar to FIG. 1 interconnected by the hole punch element of FIG. 12.
Figure 14:
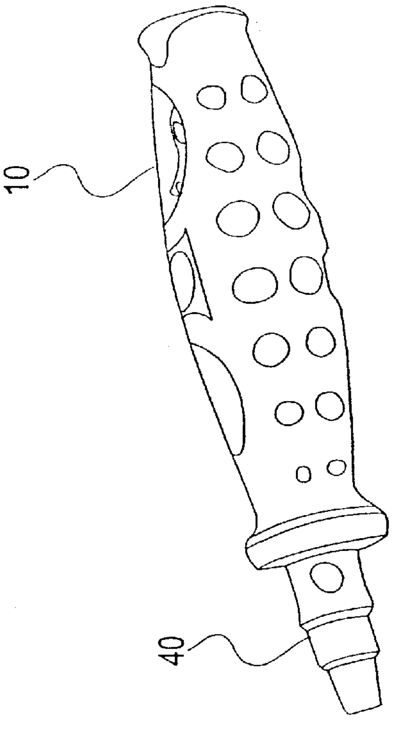
FIG. 14 is an isometric view of the hole punch element of FIG. 12 mounted on the device of FIG. 1 ready for use.

Preferably, hole puncher element 40 is configured to engage device 10 from either of two directions. In the case of a hole puncher with two blades 42 for punching different diameter holes, this renders the hole punching element reversible to alternately present each of the blades. Additionally, this feature preferably allows simultaneous engagement of two devices 10 with hole puncher element 40 as shown in FIG. 15 to provide a compact storage configuration for a complete set of hole puncher plus two gripper devices. This storage configuration is particularly convenient for handling and transportation.

Figure 16:
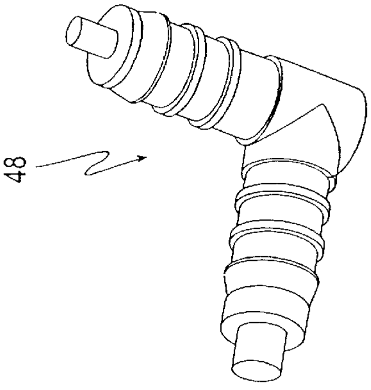
FIG. 16 is an isometric view of an alternative preferred implementation of a hole punch element, constructed and operative according to the teachings of the present invention, for use together with the device of FIG. 1.

Referring briefly to FIG. 16, it will be noted that hole puncher element need not be a linear configuration. Thus, FIG. 16 shows an alternative implementation in which a two-blade hole puncher element 48 is implemented in an L-shape form to be received by device 10 in a manner similar to the L-shape connector of FIG. 10.

Figure 17:
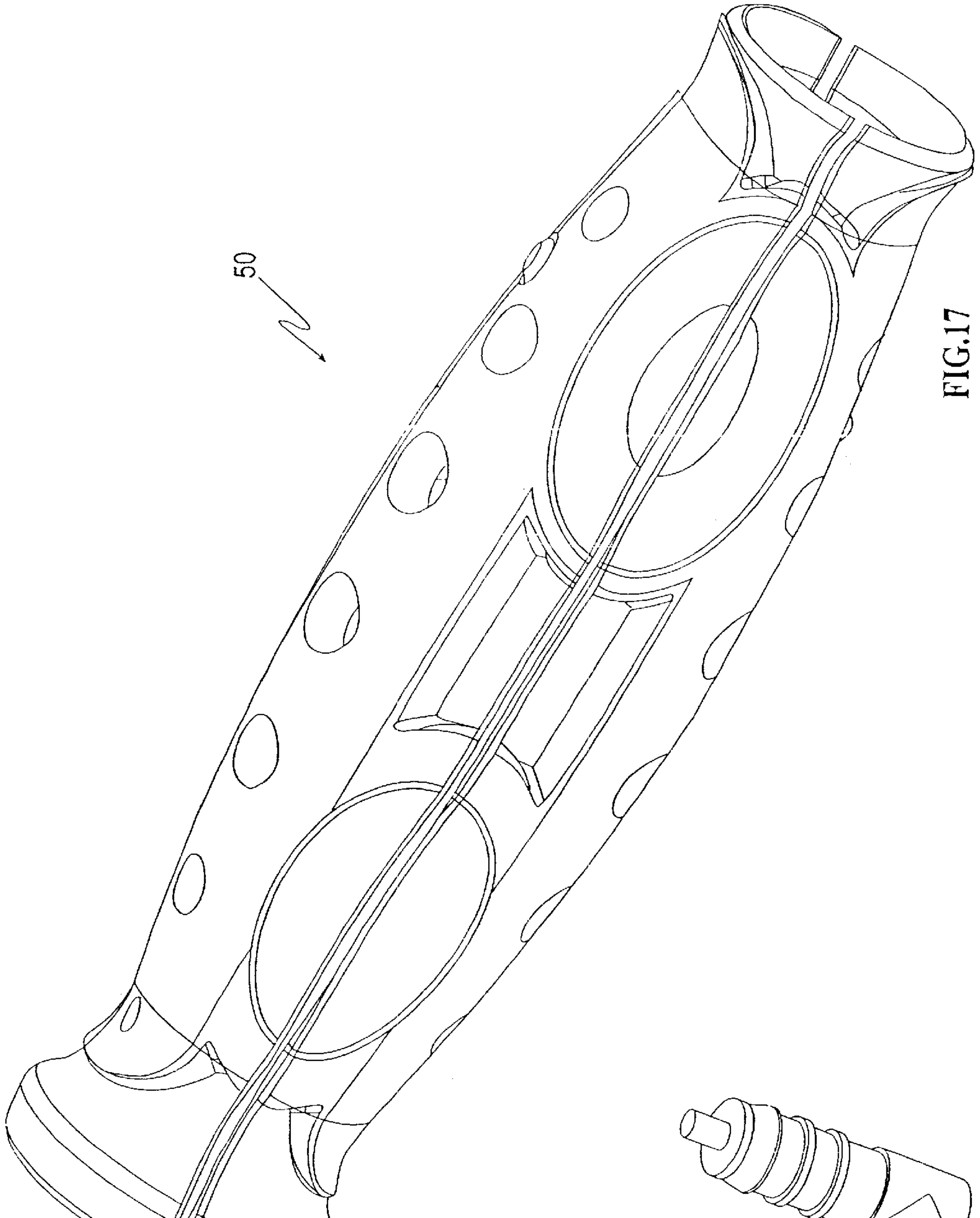
FIG. 17 is an isometric view of a simplified version of the device of FIG. 1, for use alone or together with the device of FIG. 1.

Finally, referring to FIG. 17, it should be noted that a simplified version of device 10, without either of the lateral openings, may be used to good effect for a subset of the intended uses of device 10. Thus, by way of example, FIG. 17 shows a simplified device 50, generally similar to device 10, but without the lateral openings formed by recesses 36 and 38 of the preferred implementation. Device 50 may be used alone to grip pipes, and is thought to be particularly useful as the pipe-gripping part of a set including also device 10 described above.

It will be appreciated that the above descriptions are intended only to serve as examples, and that many other embodiments are possible within the spirit and the scope of the present invention.

What is claimed is:

1. A device for facilitating manual gripping of pipes and connectors comprising:

(a) a first element;

(b) a second element hingedly attached to said first element at a hinge structure, said hinge structure being configured such that said first element is rotatable relative to said second element about a hinge axis from a closed position through a range of angles no more than 180° to a fully open position; and (c) a spring element deployed to bias said first element relative to said second element towards said open position, wherein each of said first element and said second element includes a channel extending substantially parallel to said axis, a plurality of projections being deployed projecting into each channel so as to define gripping features, said channels and said gripping features being formed such that, when said first element and said second element assume said closed position, said gripping features are located so as to grip a substantially cylindrical object of outer diameter D located parallel to said axis between said first element and said second element, and wherein said first and said second elements each further include a lateral recess configured such that, when said first element and said second element assume said closed position, said lateral recesses form a lateral opening of diameter at least 15 percent greater than D interconnecting with said channels, and wherein said first element and said second element are configured to provide, respectively, first and second grasp surfaces which, at least in said closed position, lie within a cylindrical volume of diameter 4D circumscribing said channels, said first and second grasp surfaces being shaped such that they can be pressed together by a single hand of a user to close the device around a substantially cylindrical object such that said gripping features grip the object and said grasp surfaces substantially circumscribe the object.

2. The device of claim 1, wherein said second element is substantially a mirror image of said first element.

3. The device of claim 1, wherein said projections are implemented as projecting ridges extending around at least part of said channels in a direction substantially perpendicular to said axis, said projecting ridges being spaced apart along said axis.

4. The device of claim 1, wherein said channels extend across an entire dimension of said first and said second elements from a first edge to a second edge along a length L, a portion of said channels which lies within at least about 10 percent of length L from said first edge being formed such that, when said first element and said second element assume said closed position, said channels accommodate a cylindrical element of diameter at least 15 percent greater than D.

5. The device of claim 1, wherein said first and said second elements each further include an additional lateral recess configured such that, when said first element and said second element assume said closed position, said additional lateral recesses form a lateral opening of diameter approximately equal to D interconnecting with said channels.

6. The device of claim 1, further comprising a detachable hole puncher element formed with at least one blade configured for forming a hole through a plastic wall of a pipe, said hole puncher element and said first and second elements being formed with complementary engagement features configured such that said hole puncher element releasably engages said first and second elements so as to retain said first and second elements in said closed position to provide a handle to facilitate operation of said hole puncher element.

7. The device of claim 6, wherein said hole puncher element is configured to engage said first and second elements from either of two directions.

8. The device of claim 1, wherein said first and said second elements are each formed primarily from a molded plastic material.

9. The device of claim 1, wherein each of said first and said second elements is formed with a plurality of drainage holes connecting between said channel and an external surface of said element.

10. The device of claim 1, wherein said hinge structure is configured such that said first element is rotatable relative to said second element about said hinge axis from said closed position through a range of angles no more than 90° to said fully open position.

11. A device for facilitating manual gripping of pipes and connectors comprising:

(a) a first element;

(b) a second element hingedly attached to said first element at a hinge structure, said hinge structure being configured such that said first element is rotatable relative to said second element about a hinge axis from a closed position through a range of angles no more than 180° to a fully open position; and (c) a spring element deployed to bias said first element relative to said second element towards said open position, wherein each of said first element and said second element includes a channel extending substantially parallel to said axis, a plurality of projections being deployed projecting into each channel so as to define gripping features, said channels and said gripping features being formed such that, when said first element and said second element assume said closed position, said gripping features are located so as to grip a substantially cylindrical object of outer diameter D located parallel to said axis between said first element and said second element, and wherein said first and said second elements each further include a lateral recess configured such that, when said first element and said second element assume said closed position, said lateral recesses form a lateral opening of diameter approximately equal to D interconnecting with said channels, and wherein said first element and said second element are configured to provide, respectively, first and second grasp surfaces which, at least in said closed position, lie within a cylindrical volume of diameter 4D circumscribing said channels, said first and second grasp surfaces being shaped such that they can be pressed together by a single hand of a user to close the device around a substantially cylindrical object such that said gripping features grip the object and said grasp surfaces substantially circumscribe the object.

12. The device of claim 11, wherein said second element is substantially a mirror image of said first element.

13. The device of claim 11, wherein said projections are implemented as projecting ridges extending around at least part of said channels in a direction substantially perpendicular to said axis, said projecting ridges being spaced apart along said axis.

14. The device of claim 11, wherein said channels extend across an entire dimension of said first and said second elements from a first edge to a second edge along a length L, a portion of said channels which lies within at least about 10 percent of length L from said first edge being formed such that, when said first element and said second element assume said closed position, said channels accommodate a cylindrical element of diameter at least 15 percent greater than D.

15. The device of claim 11, wherein said first and said second elements each further include an additional lateral recess configured such that, when said first element and said second element assume said closed position, said additional lateral recesses form a lateral opening of diameter at least 15 percent greater than D interconnecting with said channels.

16. The device of claim 11, further comprising a detachable hole puncher element formed with at least one blade configured for forming a hole through a plastic wall of a pipe, said hole puncher element and said first and second elements being formed with complementary engagement features configured such that said hole puncher element releasably engages said first and second elements so as to retain said first and second elements in said closed position to provide a handle to facilitate operation of said hole puncher element.

17. The device of claim 16, wherein said hole puncher element is configured to engage said first and second elements from either of two directions.

18. The device of claim 11, wherein said first and said second elements are each formed primarily from a molded plastic material.

19. The device of claim 11, wherein each of said first and said second elements is formed with a plurality of drainage holes connecting between said channel and an external surface of said element.

20. The device of claim 11, wherein said hinge structure is configured such that said first element is rotatable relative to said second element about said hinge axis from said closed position through a range of angles no more than 90° to said fully open position.

* * * * *